US012759839B2

(12) United States Patent
Gou

(10) Patent No.: US 12,759,839 B2
(45) Date of Patent: Oct. 13, 2026

(54) METHOD AND OPERATIONAL PANEL FOR INDICATING ELEVATOR SERVICE STATUS

(71) Applicant: Otis Elevator Company, Farmington, CT (US)

(72) Inventor: Xingang Gou, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1016 days.

(21) Appl. No.: 17/979,496

(22) Filed: Nov. 2, 2022

(65) Prior Publication Data

US 2023/0382684 A1 Nov. 30, 2023

(30) Foreign Application Priority Data

May 31, 2022 (CN) ......................... 202210607438.0

(51) Int. Cl.
*B66B 3/00* (2006.01)

(52) U.S. Cl.
CPC .................................... *B66B 3/004* (2013.01)

(58) Field of Classification Search
CPC .......... B66B 3/004; B66B 1/468; B66B 13/00
See application file for complete search history.

(56) References Cited

U.S. PATENT DOCUMENTS 5,969,306 A * 10/1999 Velauthapillai ......... B66B 1/462 187/399
6,230,847 B1 * 5/2001 Skolnick ................. B66B 3/004 187/395
7,398,865 B2 * 7/2008 Felder ..................... B66B 1/468 187/901
8,215,457 B2 * 7/2012 Karkela .................. B66B 1/468 187/315
2007/0015140 A1 1/2007 Kobori et al.
(Continued)

FOREIGN PATENT DOCUMENTS

EP 3401257 A1 * 11/2018 ............. B66B 1/468
JP 2015048238 A 3/2015

OTHER PUBLICATIONS

European Search Report for Application No. 22209411.2, Issued Jun. 1, 2023, 7 Pages.

*Primary Examiner* — Bickey Dhakal
(74) *Attorney, Agent, or Firm* — CANTOR COLBURN LLP

(57) ABSTRACT

A method for indicating a service status of an elevator, an elevator car operating panel for implementing the method, an elevator call-out operating panel and a computer-readable storage medium. An elevator car operating panel includes: a plurality of buttons, each of the buttons corresponding to one of a plurality of floors; a control unit coupled with the plurality of buttons, including a controller and a memory coupled with the controller, on which a computer instruction that can be executed by the controller is stored, when the computer instruction is executed: A. determining, in response to an event that one of the buttons is operated, whether a car door associated with the car operating panel is allowed to open when a car stops at a floor corresponding to the button; B. if it is allowed to open, the button is made to be in a normally lit state, otherwise, the button is made to be in a flashing state.

21 Claims, 7 Drawing Sheets

100

101

(56) References Cited

U.S. PATENT DOCUMENTS

2007/0158140 A1* 7/2007 Takeuchi ................ B66B 1/463
187/391
2011/0071682 A1* 3/2011 Reynolds .............. B66B 13/143
700/298

* cited by examiner

METHOD AND OPERATIONAL PANEL FOR INDICATING ELEVATOR SERVICE STATUS

FOREIGN PRIORITY

This application claims priority to Chinese Patent Application No. 202210607438.0, filed May 31, 2022, and all the benefits accruing therefrom under 35 U.S.C. § 119, the contents of which in its entirety are herein incorporated by reference.

TECHNICAL FIELD

The present application relates to elevator technology, in particular to a method for indicating a service status of an elevator, an elevator car operating panel for implementing the method, an elevator call-out operating panel and a computer-readable storage medium.

BACKGROUND

An elevator car may contain multiple car doors, each of which is equipped with a corresponding car operating panel. When a passenger enters the car, he enters a call request by pressing a corresponding floor button. At this time, the pressed button is lit until the car stops at the floor. Sometimes, only one door (e.g. a rear door) may be opened when the car stops at the target floor. If the passenger operates a car operating panel corresponding to a front door and always faces the front door, the passenger may not notice that the rear door is opened when the car stops at the target floor, thus mistaking the elevator for a fault, which brings a poor use experience to the passenger.

SUMMARY

According to an aspect of the present application, there is provided an elevator car operating panel, comprising: a plurality of buttons, each of the plurality of buttons corresponding to one of a plurality of floors; a control unit coupled with the plurality of buttons, comprising a controller and a memory coupled with the controller, computer instructions that can be executed by the controller are stored in the memory, the computer instructions are executed to cause the following operations: determining, in response to an event that one of the plurality of buttons is operated, whether a car door associated with the car operating panel is allowed to open when a car stops at a floor corresponding to the plurality of buttons; if it is allowed to open, the one of the plurality of buttons is made to be in a normally lit state, otherwise, the button is made to be in a flashing state.

Optionally, in the above elevator car operating panel, each of the plurality of buttons is configured to send a corresponding trigger signal to the control unit to indicate the event that each of the plurality of buttons is operated when it is pressed or an object is hovered in its vicinity.

In addition to one or more features described above, in the above elevator car operating panel, each of the plurality of buttons comprises a sensing area and a light-emitting element located behind or below the sensing area.

Optionally, in the above elevator car operating panel, the memory is a flash memory or an erasable programmable read-only memory on which configuration information about whether the car door is allowed to open when the car stops at each floor is also stored.

Optionally, in the above elevator car operating panel, the execution of the computer instructions causes operation A to be implemented in the following manner A1. receiving a trigger signal from one of the plurality of buttons; A2. determining, based on the configuration information, whether the car door associated with the car operating panel is allowed to open when the car stops at the floor corresponding to the one of plurality of buttons.

Optionally, in the above elevator car operating panel, the execution of the computer instructions causes operation B to be implemented in the following manner B1. if it is allowed to open, the light-emitting element of the corresponding button is made to be powered on; B2. if it is not allowed to open, a current or voltage input to the light-emitting element is made to be varied within a set range.

According to another aspect of the present application, there is provided an elevator car system, comprising: one or more car doors; one or more elevator car operating panels as described above, each associated with one of the car doors.

According to another aspect of the present application, there is provided an elevator call-out operating panel, comprising: one or more buttons, each for indicating a desired direction of movement of a car relative to a landing station where the elevator call-out operating panel is located; a control unit coupled with the plurality of buttons, comprising a controller and a memory coupled with the controller, computer instructions that can be executed by the controller are stored in the memory, the computer instructions are executed to cause the following operations: A'. determining, in response to an event that one of the plurality of buttons is operated, whether a landing door associated with the elevator call-out operating panel is allowed to open when a car stops at the landing station to which the elevator call-out operating panel belongs; B'. if it is allowed to open, the button is made to be in a normally lit state, otherwise, the button is made to be in a flashing state.

Optionally, in the above elevator call-out operating panel, the memory is a flash memory or an erasable programmable read-only memory on which configuration information about whether the landing door is allowed to open when the car stops at the landing station to which the elevator call-out operating panel belongs is also stored.

Optionally, in the above elevator call-out operating panel, the execution of the computer instruction causes operation A' to be implemented in the following manner A1'. receiving a trigger signal from one of the plurality of buttons; A2'. determining, based on the configuration information, whether the landing door is allowed to open when the car stops at the landing station to which the elevator call-out operating panel belongs.

Optionally, in the above elevator call-out operating panel, the execution of the computer instructions causes operation B' to be implemented in the following manner B1'. if it is allowed to open, a light-emitting element of the corresponding button is made to be powered on; B2'. if it is not allowed to open, a current or voltage input to the light-emitting element is made to be varied within a set range.

According to another aspect of the present application, there is provided a landing station system, comprising: one or more landing doors; one or more elevator call-out operating panels as described above, each associated with one of the landing doors.

According to another aspect of the present application, there is provided a method for indicating a service status of an elevator, comprising: A. determining, in response to an event that one of a plurality of buttons of an elevator car operating panel is operated, whether a car door associated with the car operating panel is allowed to open when a car reaches a floor corresponding to the button; B. if it is allowed to open, the plurality of buttons is made to be in a normally lit state, otherwise, the button is made to be in a flashing state.

According to another aspect of the present application, there is provided a method for indicating a service status of an elevator, comprising: A'. determining, in response to an event that one of buttons of an elevator call-out operating panel is operated, whether a landing door associated with the elevator call-out operating panel is allowed to open when a car stops at the landing station to which the elevator call-out operating panel belongs; B'. if it is allowed to open, the one of the buttons is made to be in a normally lit state, otherwise, the button is made to be in a flashing state.

According to another aspect of the present application, there is provided a computer-readable storage medium in which an instruction is stored. When the instruction is executed by a processor, the processor is caused to execute the above methods.

DESCRIPTION OF THE DRAWINGS

The above and/or other aspects and advantages of the present application will be clearer and more easily understood from the following description of various aspects in conjunction with the accompanying drawings, in which the same or similar elements are specified by the same reference numerals. The accompanying drawings include.

DETAILED DESCRIPTION

The following specific embodiments are only illustrative in nature and are not intended to limit the present application or applications and uses of the present application. Many specific details are set forth in the following description of the specific embodiments of the application in order to provide a more in-depth understanding of the application. However, for those of ordinary skill in the art, the application can still be practiced without providing these specific details. In some examples, familiar features are omitted to avoid complicating the description.

In this specification, terms such as "comprising" and "including" mean that in addition to units and steps that are directly and clearly stated in the specification and claims, the technical solution of the application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units.

Figure 1:
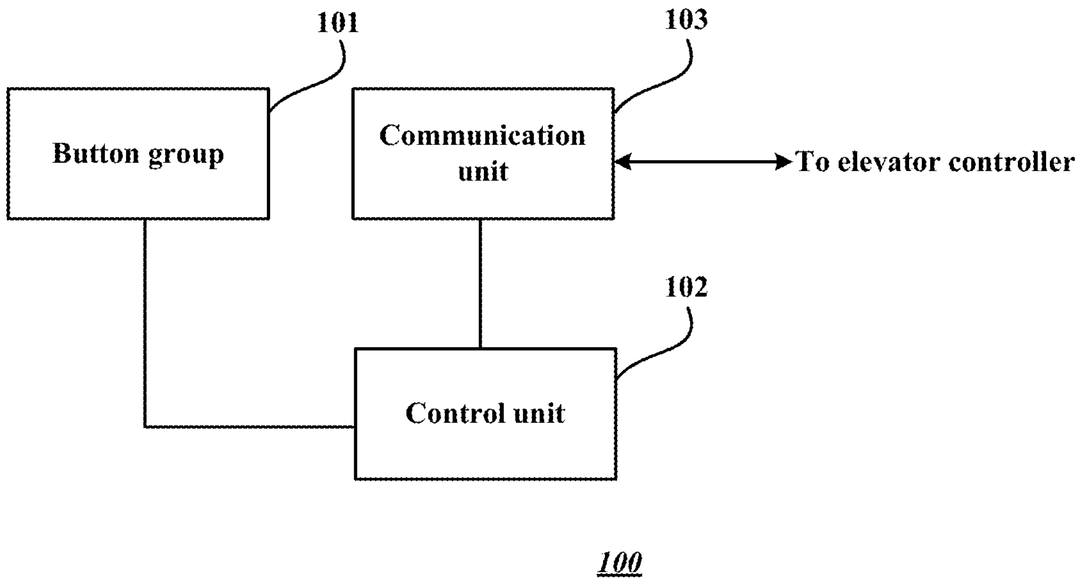
FIG. 1 is a schematic block diagram of a typical elevator car operating panel.

FIG. 1 is a schematic block diagram of a typical elevator car operating panel.

An elevator car operating panel shown in FIG. 1 is mounted inside a car and includes a button group 101, a control unit 102, and a communication unit 103.

Figure 2:
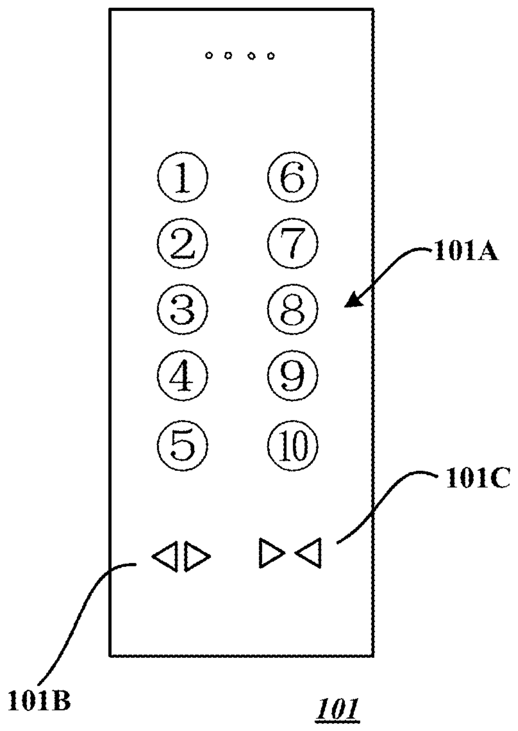
FIG. 2 is a schematic diagram of an appearance of an exemplary elevator car operating panel.

FIG. 2 is an example of the button group 101 shown in FIG. 1. Referring to FIG. 2, the button group 101 includes, for example, a plurality of floor buttons 101A (identified in the figure by numbers 1-10, each number corresponding to a corresponding floor), door opening buttons 101B and door closing buttons 101C. Exemplarily, each of the buttons in the button group 101 includes a sensing area and a light-emitting element (e.g., a light-emitting diode) located behind or below the sensing area, and the user enters various commands by pressing the corresponding button, such as a desired destination floor, closing a car door, opening the car door, etc.

In some embodiments, in the car operating panel 100 shown in FIG. 1, each of the buttons may operate in states such as normally lit, off, and flashing. It should be noted that the flashing state should refer to various states that provide dynamic display effects for the buttons, such as making the light intensity of the buttons vary within a set range (e.g. 30%-100% of the maximum light intensity). Exemplarily, the button is in a normally lit state when the button's light-emitting element is powered on, in an off state when the button's light-emitting element is disconnected from a power supply, and in a flashing state when a current or voltage input to the light-emitting element is varied.

It is noted that the button may be a push button or a non-contact button, the non-contact button may operate, for example, based on the principle of capacitive sensing, i.e., when there is an object hovering in the vicinity of the non-contact button, the capacitance can change. Therefore, the presence of an event or user input that the button is operated can be determined based on the change in capacitance.

The control unit 102 is coupled with the button group 101 and the communication unit 103. When a button in the button group 101 is pressed or an object hovers in the vicinity of the button, the control unit 102 will detect this change in state or receive a trigger signal. Exemplarily, the press of a button or the presence of a hovering object will cause a loop where the button is located to be closed, thereby generating a trigger signal at the control unit 102 (for example, a chip I/O port used to implement the control unit function is connected to the loop, so a high-level signal will be applied on the I/O port). In response to the trigger signal, the control unit 102 will perform corresponding operations, such as lighting the button by causing the light-emitting element corresponding to the button that is pressed or near which a hovering object is present to be powered on, and sending a corresponding call for the elevator to the elevator controller via the communication unit 103. The control unit 102 and the communication unit 103 (e.g., a network interface such as an ethernet port) may be implemented using a general-purpose microprocessor executing a computer program stored on a storage medium to perform the operations described herein. Alternatively, controller 20 may be implemented in hardware (e.g., ASIC, FPGA) or in a combination of hardware/software.

Figure 3A:
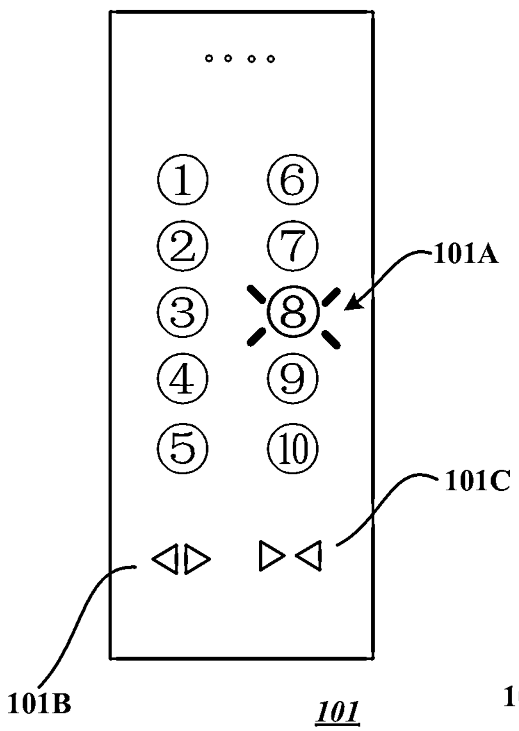
FIGS. 3A and 3B are schematic diagrams when one of the buttons of an elevator car operating panel is in a lit state and flashing state, respectively.
Figure 3B:
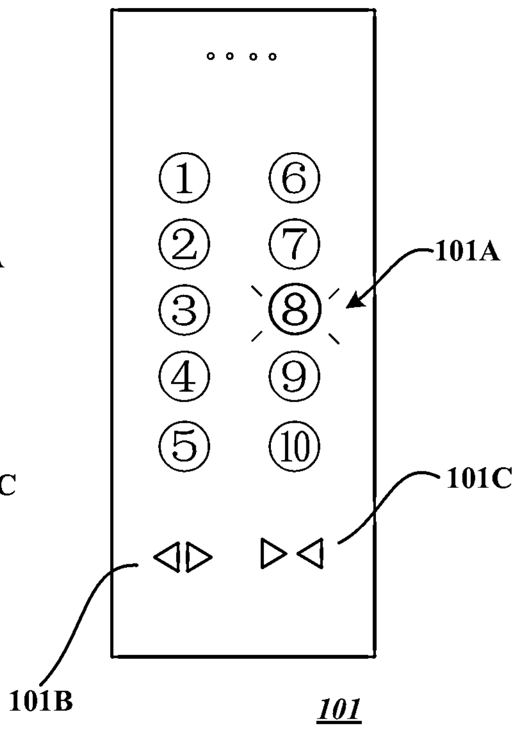

In some embodiments, the control unit 102 may control the states of the buttons based on the following control logics: in response to an event that one of the floor buttons 101A (e.g., button "⑧" identified by the number 8) is operated (e.g., the sensing area is pressed or there is an object hovering thereon), it is determined whether the car door associated with the car operating panel 100 is allowed to open when the car stops at the 8th floor corresponding to button "⑧". If it is allowed to open, the button "⑧" is made to be in a normally lit state as shown in FIG. 3A (shown by radial thick solid line in the figure), otherwise, the button "⑧" is made to be in a flashing state as shown in FIG. 3B (shown by radial thin solid line in the figure).

The correlation described here should be broadly understood as a reciprocal relation between the car operating panel and the car door in one or more aspects, and this correlation is established to enable the elevator car operating panel to better present the configuration state of the car door (especially when the car is arranged with multiple doors). For example, for a car with only one door D, the elevator car operating panel P is associated with the car door D since the user's operation on the elevator car operating panel P (e.g. pressing the sensing button or hovering near it) only involves the opening and closing of this door when the car stops at a specific floor. For example, for a car with front door FD and rear door RD, suppose that the corresponding car operating panels P1 and P2 are installed near them, respectively. Although the operation of either panel P1 and P2 will cause the car to stop at a specific floor, each of the front door FD and rear door RD can be configured separately to allow opening or prohibit opening. In this example, in order to better indicate to the user the configuration status of each car door (opening allowed or prohibited), the car operating panels P1 and P2 can be associated with the front door FD and the rear door RD, respectively, so that each panel can present the configuration status of a car door separately. The examples of positional relationships described above are only exemplary, and correlations can also be established between car operating panels and car doors based on other factors. For example, even in the case of a multi-door arrangement, if the operation on each elevator car operating panel P involves only the opening and closing of one of the doors when the car stops at a particular floor, the correlation between the two can be established accordingly.

By adding flashing states to the buttons and retaining the meaning of the operations indicated by the lit and off states, the configuration information of the car door can be presented while preserving the user's original usage habits. Since the above control logic improvement can be implemented without changing the hardware structure of the elevator car operating panel, and since this improvement does not substantially increase the complexity of the control logic, it has the advantages of low development difficulty, strong universality, and low cost for upgrading the existing elevator system.

Figure 4:
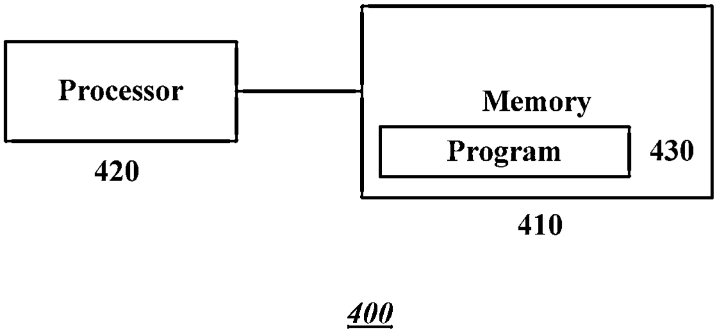
FIG. 4 is a schematic block diagram of a typical control device.

FIG. 4 is a schematic block diagram of a typical control device. The control device shown in FIG. 4 can be used to implement the control unit shown in FIG. 1.

As shown in FIG. 4, the control device comprises a memory 410 (for example, non-volatile memory such as flash memory, ROM, hard disk drive, magnetic disk, optical disc) and a processor 420 coupled with the memory 410.

The memory 410 stores a computer program 430 executable by the processor 420. In some embodiments, the memory 410 may also store configuration information about whether the car door is allowed to open when the car stops at each floor. An example of configuration information is shown in the following table.

TABLE 1

| Floor | Configuration status of front door | Configuration status of rear door |
|---|---|---|
| 1 | E | E |
| 2 | D | E |
| 3 | D | E |
| 4 | D | E |
| 5 | E | E |
| 6 | E | E |
| 7 | E | E |
| 8 | E | D |
| 9 | E | D |
| 10 | E | D |

In the table above, E and D indicate that opening is allowed and opening is prohibited respectively.

The processor 420 is configured to run the computer program 430 stored on the memory 410 and to access data (such as querying configuration information, modifying configuration information, etc.) on the memory 410.

The computer program 430 may include computer instructions for implementing the control logic described above with the help of the accompanying drawings, so that corresponding methods can be implemented when the computer program 430 is run on the processor 420.

Figure 5:
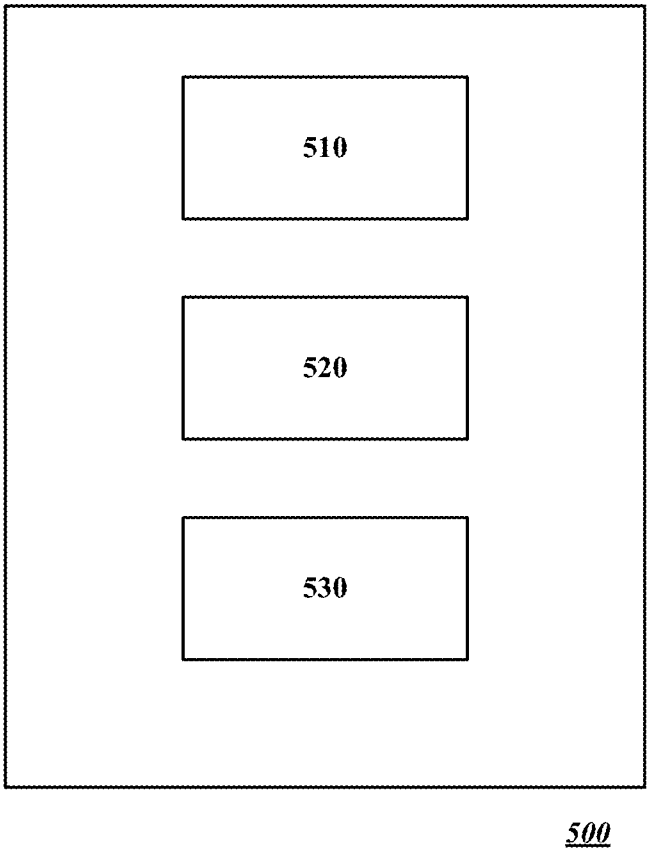
FIG. 5 is a schematic block diagram of a typical elevator car system.

FIG. 5 is a schematic block diagram of a typical elevator car system.

Referring to FIG. 5, an elevator car system 500 includes a car 510, one or more car doors 520, and one or more elevator car operating panels 530 mounted inside the car 510. Each of the elevator car operating panels 530 is associated with a corresponding car door. In the elevator car system shown in FIG. 5, the elevator car operating panel 530 may have the structures and features of the embodiments described above with the help of the accompanying drawings, in particular, the operating panel uses the control logic described above to present the configuration information of the car doors.

Figure 6:
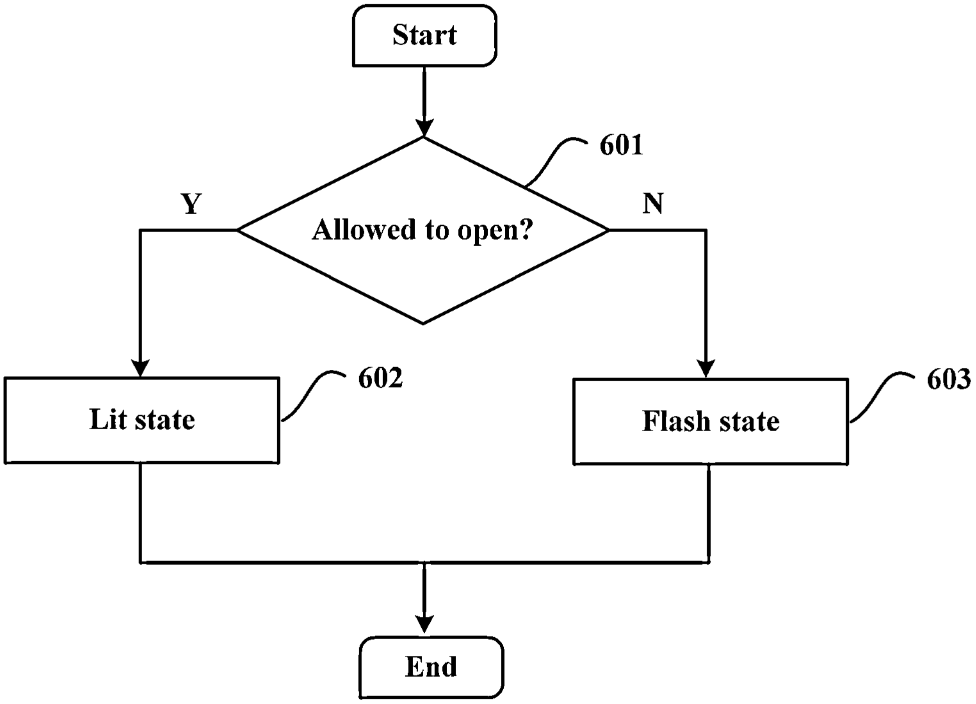
FIG. 6 is a flowchart of a method for indicating a service status of an elevator in accordance with some embodiments of the present application.

FIG. 6 is a flowchart of a method for indicating a service status of an elevator in accordance with some embodiments of the present application. Exemplarily, the individual steps of the method shown in FIG. 6 are described below using the elevator car operating panel shown in FIG. 1 as an example.

The method shown in FIG. 6 includes the following steps:

Step 601: The control unit 102, in response to an event that one of the button group 101 (e.g. button "⑧") is operated, determines whether the car door associated with the car operating panel 100 (assumed to be the front door of the car) is allowed to open when the car reaches the floor corresponding to that button (8th floor). If it is allowed, go to step 602, otherwise go to step 603.

Exemplarily, this step may be implemented in the following manner:

The control unit 102 first receives a trigger signal from one of the buttons (still taking button "⑧" as an example) and then accesses the configuration information stored in the memory 410 to determine whether the front door of the car is allowed to open when the car reaches the 8th floor.

Step 602: Since it is determined from the configuration information that the front door is allowed to open when the car stops at the 8th floor, the control unit 102 makes the button "⑧" in a normally lit state as shown in FIG. 3A.

Step 603: Since it is determined from the configuration information that the front door is forbidden to open when the car stops at the 8th floor, the control unit 102 makes the button "⑧" in a flashing state as shown in FIG. 3B.

Figure 7:
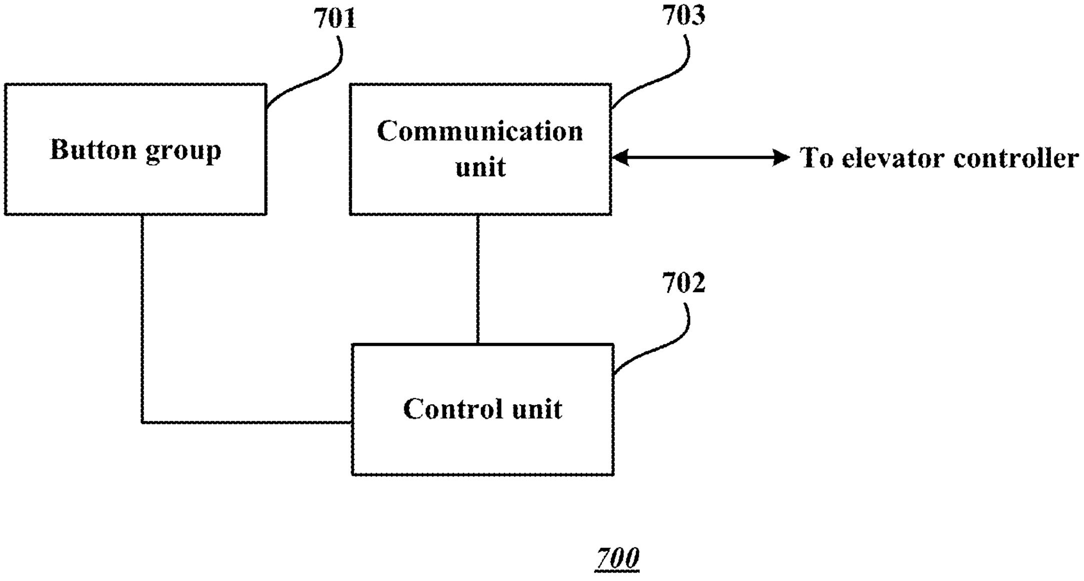
FIG. 7 is a schematic block diagram of a typical elevator call-out operating panel.

FIG. 7 is a schematic block diagram of a typical elevator call-out operating panel.

The elevator call-out operating panel shown in FIG. 7 is mounted on one side of a landing door of an elevator and includes a button group 701, a control unit 702, and a communication unit 703.

Figure 8:
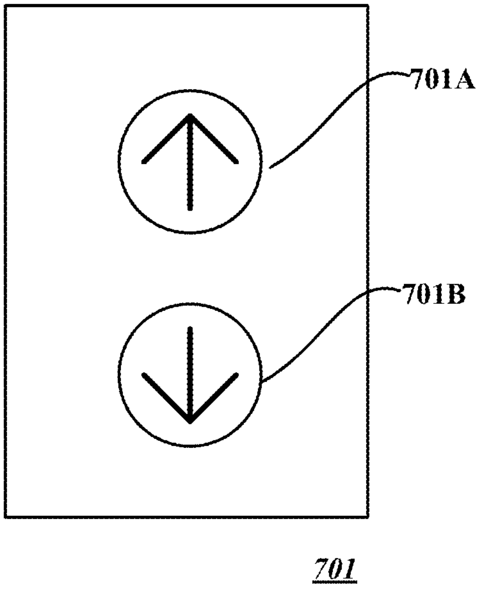
FIG. 8 is a schematic diagram of an appearance of an exemplary elevator call-out call operating panel.

FIG. 8 is an example of the button group 701 shown in FIG. 7. Referring to FIG. 8, the button group 701 includes, for example, buttons 701A, 701B corresponding to the "up" and "down" directions. Similarly, each of the buttons in the button group 701 includes a sensing area and a light-emitting element (e.g., a light-emitting diode) located behind or below the sensing area, and the user inputs a command about the car motion direction by pressing the corresponding button. In some embodiments, buttons 701A and 702B may operate in states such as normally lit, off and flashing, and the buttons may be push buttons or non-contact buttons.

The control unit 702 is coupled with the button group 701 and the communication unit 703. When a button in the button group 701 is pressed or an object hovers in the vicinity of the button, the control unit 702 will detect this change in state. Exemplarily, the press of a button or the presence of a hovering object will cause a loop where the button is located to be closed, thereby generating a trigger signal at the control unit 702. In response to the trigger signal, the control unit 702 will perform corresponding operations, such as lighting the button by causing the light-emitting element corresponding to the button that is pressed or near which a hovering object is present to be powered on, and sending a corresponding call for the elevator to the elevator controller via the communication unit 703.

Figure 9A:
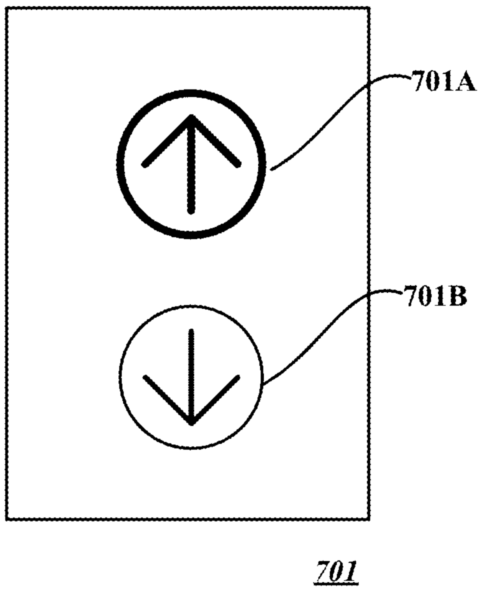
FIGS. 9A and 9B are schematic diagrams when one of the buttons of an elevator call-out operating panel is in a lit state and flashing state, respectively.
Figure 9B:
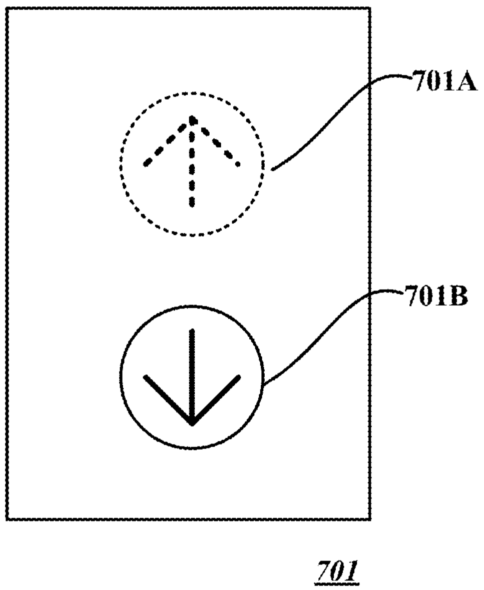

In some embodiments, the control unit 702 may control the states of the buttons based on the following control logics: in response to an event that one of the floor buttons 701 (e.g., up button 701A) is operated (e.g., the sensing area is pressed or there is an object hovering thereon), it is determined whether the landing door associated with the elevator call-out operating panel 700 is allowed to open when the car stops at the floor or landing station to which the elevator call-out operating panel 700 belongs. If it is allowed to open, the up button is made to be in a normally lit state as shown in FIG. 9A (shown as a thick solid circle in the figure), otherwise, the up button is made to be in a flashing state as shown in FIG. 9B (shown as a dashed solid circle in the figure). The correlation described here should be broadly understood as a correlation between the elevator call-out operating panel and the landing door in one or more aspects, and this correlation is established to enable the elevator call-out operating panel to better present the configuration state of the landing door. For example, since the operation of the user on the elevator call-out operating panel V (e.g. pressing the sensing button or hovering near it) will involve the opening and closing of the landing door D' when the car stops at a particular floor, the elevator call-out operating panel P' is associated with the landing door D'.

The control unit shown in FIG. 7 can be implemented using the control device shown in FIG. 4. In some embodiments, the memory 410, in addition to storing the computer program 430 executable by the processor 420 to implement the control logic described above, may also store configuration information about whether the landing door is allowed to open when the car stops at each floor. An example of configuration information is shown in the following table.

TABLE 2

| Number of floor or landing door | Configuration status |
|---|---|
| n | E |

In the above table, E indicates that it is allowed to open. If the landing door n needs to be configured to be disabled from opening, the field value of the configuration status can be set to D.

Figure 10:
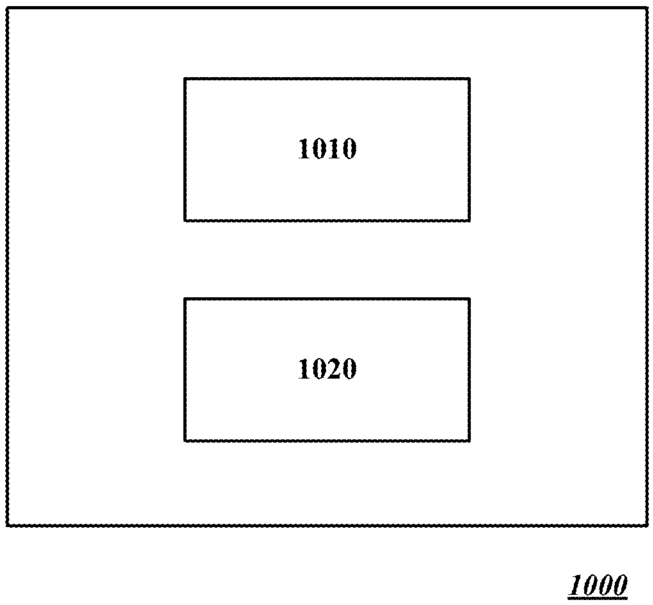
FIG. 10 is a schematic block diagram of a typical landing station system.

FIG. 10 is a schematic block diagram of a typical landing station system.

Referring to FIG. 10, the landing station system 1000 includes one or more landing doors 1010 and one or more elevator call-out operating panels 1020 mounted on one side of the associated landing door 1010. In the landing station system shown in FIG. 10, the elevator call-out operating panel 1020 may have the structures and features of the embodiments described above with the help of the accompanying drawings, in particular, the operating panel uses the control logic described above to present the configuration information of the landing doors.

Figure 11:
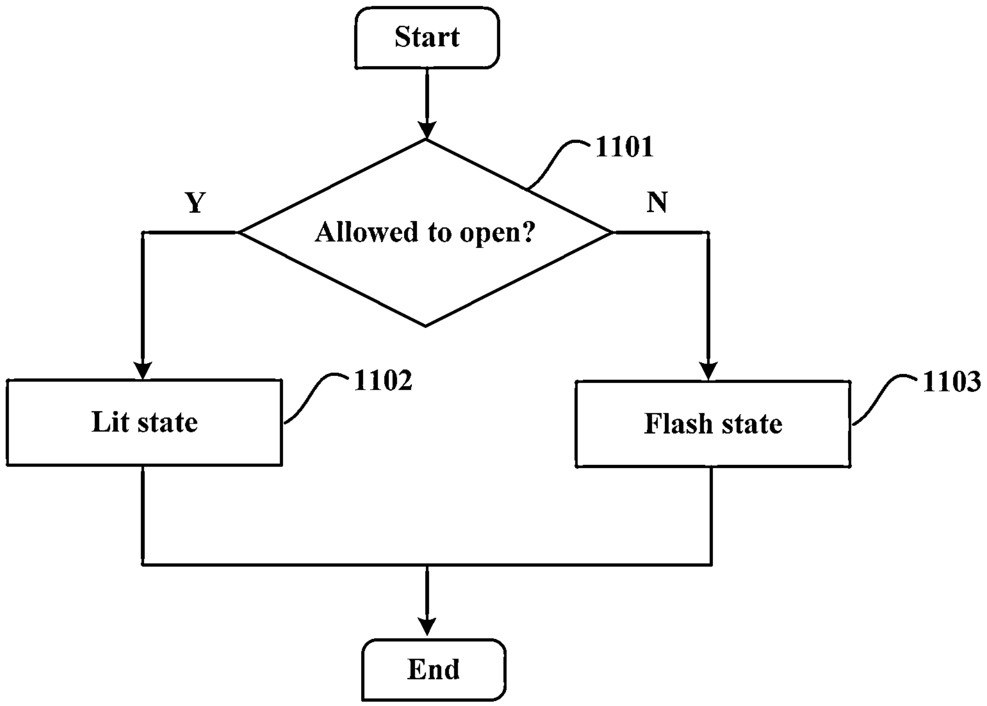
FIG. 11 is a flowchart of a method for indicating a service status of an elevator in accordance with other embodiments of the present application.

FIG. 11 is a flowchart of a method for indicating a service status of an elevator in accordance with other embodiments of the present application. Exemplarily, the individual steps of the method shown in FIG. 11 are described below using the elevator call-out operating panel shown in FIG. 7 as an example.

The method shown in FIG. 11 includes the following steps:

Step 1101: The control unit 702, in response to an event that one of the button group 701 (e.g., the up button) is operated, determines whether the landing door D' associated with the elevator call-out operating panel 700 is allowed to open when the car reaches the landing station or floor corresponding to that button (e.g., assuming the 8th floor). If it is allowed, go to step 1102, otherwise go to step 1103.

Exemplarily, this step may be implemented in the following manner:

The control unit 702 first receives a trigger signal from one of the buttons (still taking the up button as an example) and then accesses the configuration information stored in the memory 410 to determine whether the landing door D' is allowed to open when the car reaches the 8th floor.

Step 1102: Since it is determined from the configuration information that the landing door D' is allowed to open when the car stops at the 8th floor, the control unit 702 makes the up button in a normally lit state as shown in FIG. 9A.

Step 1103: Since it is determined from the configuration information that the landing door D' is forbidden to open when the car stops at the 8th floor, the control unit 702 makes the up button in a flashing state as shown in FIG. 9B.

According to another aspect of the present application, there is also provided a computer-readable storage medium on which a computer program is stored. When the program is executed by the processor, one or more steps contained in the method described above with the help of FIGS. 6 and 11 may be realized.

The computer-readable storage medium referred to in the application includes various types of computer storage media, and may be any available medium that may be accessed by a general-purpose or special-purpose computer. For example, the computer-readable storage medium may include RAM, ROM, EPROM, E2PROM, registers, hard disks, removable disks, CD-ROM or other optical disk storage, magnetic disk storage or other magnetic storage devices, or any other transitory or non-transitory medium that may be used to carry or store a desired program code unit in the form of instructions or data structures and that may be accessed by a general-purpose or special-purpose computer or a general-purpose or special-purpose processor. Disks as used herein usually copy data magnetically, while discs use lasers to optically copy data. The above combination should also be included in the protection scope of the computer-readable storage medium. An exemplary storage medium is coupled to the processor such that the processor can read and write information from and to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will appreciate that the various illustrative logical blocks, modules, circuits, and algorithm steps described herein may be implemented as electronic hardware, computer software, or combinations of both.

To demonstrate this interchangeability between hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in varying ways for the particular application. However, such implementation decisions should not be interpreted as causing a departure from the scope of the present application.

Although only a few of the specific embodiments of the present application have been described, those skilled in the art will recognize that the present application may be embodied in many other forms without departing from the spirit and scope thereof. Accordingly, the examples and embodiments shown are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

What is claimed is:

1. An elevator car operating panel, comprising:

a plurality of buttons, each of the buttons corresponding to one of a plurality of floors;

a control unit coupled with the plurality of buttons, comprising a controller and a memory coupled with the controller, computer instructions that can be executed by the controller are stored in the memory, the computer instructions, when executed by the controller, cause the following operations:

A. determining, in response to an event that one of the plurality of buttons is operated, whether a car door associated with the car operating panel is allowed to open when a car stops at a floor corresponding to the one of the plurality of buttons;

B. if the car door is allowed to open, the button is made to be in a normally lit state, otherwise, the one of the plurality of buttons is made to be in a flashing state.

2. The elevator car operating panel of claim 1, wherein each of the plurality of buttons is configured to send a corresponding trigger signal to the control unit to indicate the event that the button is operated when the button is pressed or an object is hovered in its vicinity.

3. The elevator car operating panel of claim 1, wherein each of the plurality of buttons comprises a sensing area and a light-emitting element located behind or below the sensing area.

4. The elevator car operating panel of claim 3, wherein the execution of the computer instruction causes operation B to be implemented in the following manner:

B1. if the car door is allowed to open, the light-emitting element of the corresponding button is made to be powered on;

B2. if the car door is not allowed to open, a current or voltage input to the light-emitting element is made to be varied within a set range.

5. The elevator car operating panel of claim 1, wherein the memory is a flash memory or an erasable programmable read-only memory on which configuration information about whether the car door is allowed to open when the car stops at each floor is also stored.

6. The elevator car operating panel of claim 5, wherein the execution of the computer instruction causes operation A to be implemented in the following manner:

A1. receiving a trigger signal from one of the plurality of buttons;

A2. determining, based on the configuration information, whether the car door associated with the car operating panel is allowed to open when the car stops at the floor corresponding to the button.

7. An elevator car system, comprising:

one or more car doors;

one or more elevator car operating panels as claimed in claim 1, each associated with one of the car doors.

8. An elevator call-out operating panel, comprising:

one or more buttons, each for indicating a desired direction of movement of a car relative to a landing station where the elevator call-out operating panel is located;

a control unit coupled with a plurality of buttons, comprising a controller and a memory coupled with the controller, computer instructions that can be executed by the controller are stored in the memory, the computer instructions, when executed by the controller, cause the following operations:

A'. determining, in response to an event that one of the plurality of buttons is operated, whether a landing door associated with the elevator call-out operating panel is allowed to open when a car stops at the landing station to which the elevator call-out operating panel belongs;

B'. if the car door is allowed to open, the one of the plurality of buttons is made to be in a normally lit state, otherwise, the one of the plurality of button is made to be in a flashing state.

9. The elevator call-out operating panel of claim 8, wherein each of the plurality of the buttons is configured to send a corresponding trigger signal to the control unit to indicate the event that the buttons is operated when the button is pressed or an object is hovered in its vicinity.

10. The elevator call-out operating panel of claim 8, wherein each of the plurality of buttons comprises a sensing area and a light-emitting element located behind or below the sensing area.

11. The elevator call-out operating panel of claim 10, wherein the execution of the computer instruction causes operation B' to be implemented in the following manner:

B1'. if the car door is allowed to open, the light-emitting element of the corresponding button is made to be powered on;

B2'. if the car door is not allowed to open, a current or voltage input to the light-emitting element is made to be varied within a set range.

12. The elevator call-out operating panel of claim 8, wherein the memory is a flash memory or an erasable programmable read-only memory on which configuration information about whether the landing door is allowed to open when the car stops at the landing station to which the elevator call-out operating panel belongs is also stored.

13. The elevator call-out operating panel of claim 12, wherein the execution of the computer instructions causes operation A' to be implemented in the following manner:

A1'. receiving a trigger signal from one of the plurality of buttons;

A2'. determining, based on the configuration information, whether the landing door is allowed to open when the car stops at the landing station to which the elevator call-out operating panel belongs.

14. A landing station system, comprising:

one or more landing doors;

one or more elevator call-out operating panels as claimed in claim 8, each associated with one of the landing doors.

15. A method for indicating a service status of an elevator, comprising:

A. determining, in response to an event that one of a plurality of buttons of an elevator car operating panel is operated, whether a car door associated with the car operating panel is allowed to open when a car reaches a floor corresponding to the one of the plurality of buttons;

B. if the car door is allowed to open, the one of the plurality of buttons is made to be in a normally lit state, otherwise, the button is made to be in a flashing state.

16. The method of claim 15, wherein step A comprises:

A1. receiving a trigger signal from the one of the plurality of buttons;

A2. determining, based on configuration information stored in a memory in the car operating panel, whether the car door associated with the car operating panel is allowed to open when the car stops at the floor corresponding to the one of the plurality of buttons.

17. The method of claim 15, wherein step B comprises:

B1. if the car door is allowed to open, a light-emitting element of the corresponding button is made to be powered on;

B2. if the car door is not allowed to open, a current or voltage input to the light-emitting element is made to be varied within a set range.

18. A non-transitory computer-readable storage medium having instructions stored thereon, when the instructions are executed by a processor, the processor is caused to execute the method of claim 15.

19. A method for indicating a service status of an elevator, comprising:

A'. determining, in response to an event that one of buttons of an elevator call-out operating panel is operated, whether a landing door associated with the elevator call-out operating panel is allowed to open when a car stops at a landing station to which the elevator call-out operating panel belongs;

B'. if the car door is allowed to open, the one of buttons is made to be in a normally lit state, otherwise, the one of buttons is made to be in a flashing state.

20. The method of claim 19, wherein step A' comprises:

A1'. receiving a trigger signal from the one of the buttons;

A2'. determining, based on configuration information, whether the landing door is allowed to open when the car stops at the landing station to which the elevator call-out operating panel belongs.

21. The method of claim 19, wherein step B' comprises:

B1'. if the car door is allowed to open, a light-emitting element of the corresponding button is made to be powered on;

B2'. if the car door is not allowed to open, a current or voltage input to the light-emitting element is made to be varied within a set range.

* * * * *